US012710782B2

(12) United States Patent
Conigliaro et al.

(10) Patent No.: US 12,710,782 B2
(45) Date of Patent: Aug. 18, 2026

(54) SELECTOR KNOB FOR A MOTOR VEHICLE

(71) Applicant: FERRARI S.P.A., Modena (IT)

(72) Inventors: Vito Conigliaro, Modena (IT); Davide Marcon, Modena (IT); Tommaso Carditello, Modena (IT)

(73) Assignee: FERRARI S.P.A. (IT)

( * ) Notice: Subject to any disclaimer, the term of this patent is extended or adjusted under 35 U.S.C. 154(b) by 0 days.

(21) Appl. No.: 18/968,293

(22) Filed: Dec. 4, 2024

(65) Prior Publication Data

US 2025/0181101 A1 Jun. 5, 2025

(30) Foreign Application Priority Data

Dec. 5, 2023 (IT) ........................ 102023000025962

(51) Int. Cl.
*G05G 1/10* (2006.01)
*B60K 35/10* (2024.01)
(Continued)

(52) U.S. Cl.
CPC ............... *G05G 1/10* (2013.01); *B60K 35/10* (2024.01); *B62D 1/046* (2013.01); *G05G 5/06* (2013.01);
(Continued)

(58) Field of Classification Search
CPC . G05G 1/10; G05G 5/06; G05G 5/065; B62D 1/046; B60K 35/10; B60K 2360/126; B60K 2360/782
See application file for complete search history.

(56) References Cited

U.S. PATENT DOCUMENTS 3,517,570 A 6/1970 Kolb
7,549,649 B2 * 6/2009 Baldet .................. B60T 8/1755 74/473.31

(Continued)

FOREIGN PATENT DOCUMENTS

CN 102874295 A 1/2013
DE 102008045232 A1 3/2010

(Continued)

OTHER PUBLICATIONS

Machine translation of CN 102874295 A obtained on Sep. 2, 2025.*

(Continued)

*Primary Examiner* — Adam D Rogers
(74) *Attorney, Agent, or Firm* — The Belles Group, P.C.

(57) ABSTRACT

A selector knob for a motor vehicle is disclosed. The selector knob comprises a support adapted to be attached to a component of the motor vehicle, a lever carried by the support in a rotatable manner about a straight axis among a plurality of distinct angular positions, transduction means configured to detect information about an actual angular position of the lever and to generate a control signal corresponding to the detected information, and a cam element coupled to the support in a movable manner along a radial direction with respect to said axis and fixed with respect to (Continued)

the support, the cam element further being stably cooperating in contact with a radially inner surface of the lever extending about said axis and defining a plurality of grooves, each of which accommodates the cam element when the lever reaches a said distinct angular position.

18 Claims, 8 Drawing Sheets

(51) Int. Cl.
*B62D 1/04* (2006.01)
*G05G 5/06* (2006.01)

(52) U.S. Cl.
CPC .. *B60K 2360/126* (2024.01); *B60K 2360/782* (2024.01)

(56) References Cited

U.S. PATENT DOCUMENTS 9,268,356 B2 * 2/2016 Burleson .................. G05G 5/06
10,046,769 B2 * 8/2018 Barone ................ B60W 10/113
2003/0023353 A1 * 1/2003 Badarneh ............... B60K 35/22 701/1
2009/0223321 A1 9/2009 Stefani
2014/0260776 A1 9/2014 Burleson
2024/0092416 A1 * 3/2024 Ballatore ............... B60K 35/21
2024/0408962 A1 * 12/2024 de Walle ................ B60K 35/10
2025/0178435 A1 * 6/2025 Conigliaro ............. B60K 35/10

FOREIGN PATENT DOCUMENTS

DE 102018009557 A1 * 6/2020 ............. B60K 35/60
DE 102019135872 B3 * 6/2021 ........... H01H 19/005
DE 102023123048 A1 * 3/2025 ............. B60K 35/10
GB 2624209 A * 5/2024 ........... F16H 59/105

OTHER PUBLICATIONS

Machine translation of DE 102018009557 A1 obtained on Sep. 2, 2025.*

Examiner Cedric Rossatto, Italian Search Report and Written Opinion, Italian Patent Application No. 202300025962, Completion Date Jun. 11, 2024, 7 pp.

* cited by examiner

PRIOR-ART

PRIOR-ART

FIG. 5
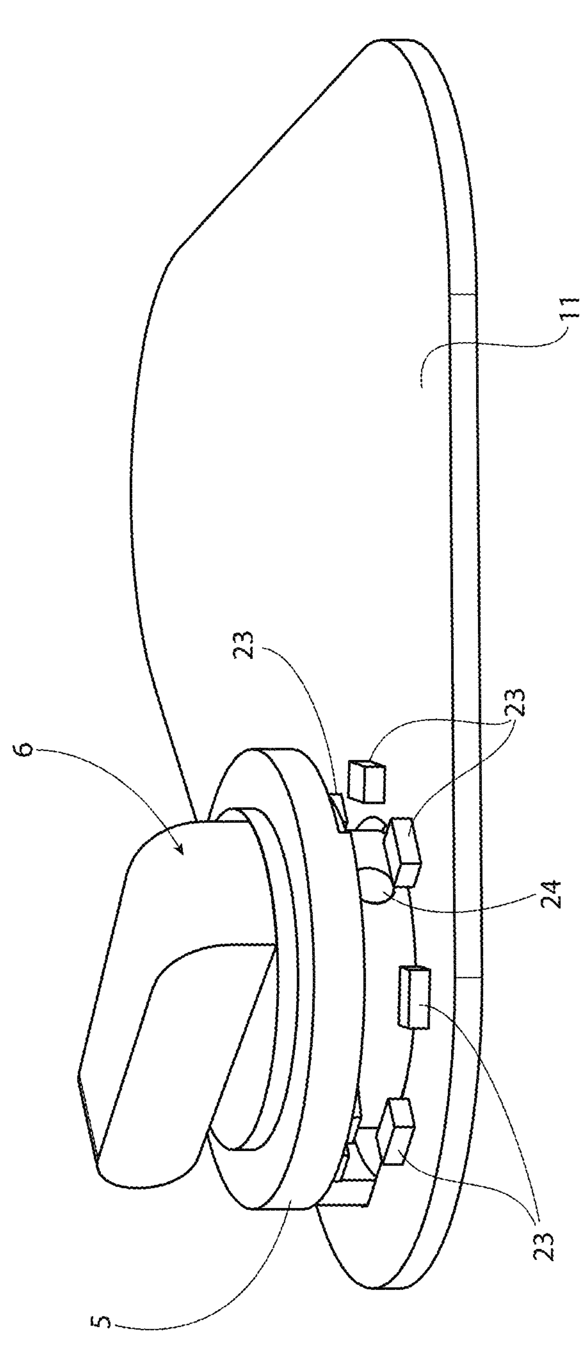
11
23
23
6
24
5
23

SELECTOR KNOB FOR A MOTOR VEHICLE

CROSS-REFERENCE TO RELATED APPLICATION

This patent application claims priority from Italian patent application no. 102023000025962 filed on Dec. 5, 2023, the entire disclosure of which is incorporated herein by reference.

TECHNICAL FIELD

The invention relates to a selector knob for a motor vehicle, in particular part of a steering wheel of the motor vehicle and, more in particular, serving as a selector for a setup or control settings of the motor vehicle.

BACKGROUND

Some of the Applicant's vehicles feature at least one knob mounted on the steering wheel and serving as a selector for the setup or control settings. More in detail, the control settings can relate, for example, to suspension configuration, stability control, traction control and the like. In commercial terms, the knob also is better known as a "hand lever", as it recalls the appearance of some manual controls used on motor vehicles of the past.

FIGS. 1 and 2 show an example of a knob 100 already used in some cars available in the market. The knob 100 comprises a plastic support 101, a rotor 102 and a lever 103 defining the portion of the knob 100 that can be operated by a driver. The lever 103 is attached to the rotor 102, which axially extends along a straight direction 104 and is rotatable with respect to the support 101. The support 101 also axially extends along the direction 104 and is internally hollow so as to accommodate the rotor 102. The rotor 102 has two openings facing one another along a radial direction 107 with respect to the direction 104 and defining the ends of a through-hole going through the rotor 102.

A pair of cams 105 coupled to one another by a spring 106 extending along the radial direction 107 are arranged through the through-hole, whereby they can be brought closer to one another along the radial direction 107 against the action of the spring 106, which, on the other hand, acts to move the cams 105 away from one another along the radial direction 107. The cams 105 are preferably made of a metal material. The cams 105 radially project from the openings to steadily cooperate in contact with a radially inner surface (not shown) of the support 101. The radially inner surface is formed by a circumferential sequence of grooves, wherein the cam 105 centrally lies, due to the pre-loading of the spring 106, in respective positions of stable balance of the knob 100.

The driver, who imparts a rotation to the lever 103 from one of the stable balance positions, causes a rotation of the rotor 102; the cams 105 follow the rotation of the rotor 102, as they are arranged through the radial hole of the rotor 102, cooperating in contact with the radially inner surface of the support 101. The cooperation between the cams 105 and the support 101 leads to a compression of the spring 106 and consequently causes the cams 105 to move closer to one another along the radial direction 107, until each of the cams 105 leaves the corresponding groove to get into the circumferentially next groove. Here, the spring 106 radially expands again, so that each of the cams 105 can settle in the circumferentially next groove, even if the driver stops following the rotation of the lever 103. In this change of position of the knob 100, the driver receives a feeling of resistance given by the cooperation between the cams 105 and the support 101, as well as by the compression of the spring 106, when the knob 100 leaves its current stable balance position, and a feeling of release when the cams 105 get into the circumferentially next grooves, due to the reaction expansion of the spring 106. Furthermore, the driver also perceives the sound generated by the cooperation between the cams 105 and the support 101.

The knob 100 further has an unstable position, as FIG. 2 will help understand. To achieve the unstable position, the knob 100 comprises a torsional spring 109 inserted in a seat axially obtained on an axial end of the rotor 102 opposite the other axial end coupled to the lever 103. The axis of the spring 109 coincides with the direction 104; the spring 109 has at least one end attached to the rotor 102 and a free end 110, which radially protrudes from the rotor 102. Correspondingly, the support 101 comprises a striker portion 111, with which the free end 110 of the spring 109 cooperates when the knob 100 reaches the unstable position. The radial inner surface of the support 101 defines a groove corresponding to the unstable position and, per se, similar to the other grooves, so that the corresponding one of the cams 105 can get into the latter groove, but against the reaction of the spring 109, whose integral rotation together with the rotor 102 is hindered by the striker portion 111, so that the spring 109 undergoes a twisting moment that torsionally loads the spring 109. The driver, who therefore brings the knob 100 to the unstable position, will receive an obstacle sensation given by the torsional reaction of the spring 109.

The stable balance positions and the unstable position of the knob 100 correspond to respective control settings for the vehicle. In particular, the unstable position corresponds to an extreme setup of the vehicle, in which substantially all the automatic controls are deactivated to enable a substantially manual driving of the vehicle. For this reason, the obstacle sensation guaranteed by the spring 109 is convenient to warn the driver about reaching the unstable position.

The knob 100 comprises a permanent magnet 112 attached to the axial end of the rotor 102 opposite the one coupled to the lever 103 in an eccentric position with respect to the direction 104. The magnet 112 faces a printed circuit board 113, to which a magnetic field sensor 114 is coupled in the direction 104, i.e. at the centre of the rotor 102. In this way, the magnetic field sensor 114 detects the direction of the magnetic field emitted by the magnet 112 and provides the relative information to a control unit 115 of the knob 100. The control unit 115 determines, from the information, the position of the rotor 102 and, hence, of the knob 100, since the position of the rotor 102 will be directly correlated with the direction of the magnetic field emitted by the magnet 112. By so doing, the control unit 115 imposes the control settings corresponding to the current position of the knob 100 among the stable balance positions and the unstable position.

Although the knob 100 is generally satisfactory per se, a need for improvement is nevertheless felt. More in particular, the axial dimension of the knob 100 needs to be reduced, while not sacrificing the above-explained functionalities of the knob 100, including the presence of the unstable position. Furthermore, there is also a need to improve the sensations received by the driver or user. An object of the invention is to fulfil at least one of the needs discussed above, preferably in a simple and reliable fashion.

DESCRIPTION OF THE INVENTION

In one form, the invention can be a selector knob for a motor vehicle, the selector knob comprising a support adapted to be attached to a component of the motor vehicle, a lever carried by the support in a rotatable manner about a straight axis among a plurality of distinct angular positions, transduction means configured to detect information about an actual angular position of the lever between said distinct angular positions and to generate a control signal corresponding to the detected information to select a control setting of the motor vehicle associated with the actual angular position, and at least one cam member coupled to the support in a movable manner along a radial direction with respect to said axis and fixed with respect to the support, the cam member further being stably cooperating in contact with a radially inner surface of the lever extending about said axis and defining a plurality of grooves, each of which accommodates the cam element when the lever reaches a corresponding one of said distinct angular positions.

In one form, the invention can be a steering wheel assembly for a motor vehicle, the steering wheel assembly comprising a steering column and a steering wheel rotatable with respect to the steering column about a steering wheel axis and comprising the selector knob of the preceding paragraph. In one form, the invention can be a motor vehicle comprising the steering wheel assembly and a control unit configured to receive the control signal and control the control setting according to the received control signal.

In one form, the invention can be a selector knob for a motor vehicle, the selector knob comprising a support adapted to be attached to a component of the motor vehicle, a lever carried by the support in a rotatable manner about an axis among a plurality of distinct angular positions, a transduction assembly configured to detect information about an actual angular position of the lever and to generate a control signal corresponding to the detected information, and a cam member coupled to the support in a movable manner along a radial direction with respect to said axis, the radial direction being fixed with respect to the support, the cam member further being stably cooperating in contact with a radially inner surface of the lever extending about said axis and defining a plurality of grooves, each of which accommodates the cam element when the lever reaches a corresponding one of said distinct angular positions.

In one form, the invention can be a steering wheel assembly for a motor vehicle, the steering wheel assembly comprising a steering column and a steering wheel rotatable with respect to the steering column about a steering wheel axis and comprising the selector knob of the preceding paragraph. In one form, the invention can be a motor vehicle comprising the steering wheel assembly and a control unit configured to receive the control signal and to select a control setting of the motor vehicle associated with the actual angular position.

In one form, the invention can be a selector knob for a motor vehicle, the selector knob comprising a support adapted to be attached to a component of the motor vehicle, a lever carried by the support in a rotatable manner about an axis among a plurality of distinct angular positions, the lever comprising a radially inner surface extending about said axis and grooves defined in the radially inner surface, a sensor system configured to detect information about an actual angular position of the lever and to generate a control signal corresponding to the detected information, and a cam member coupled to the support in a movable manner along a radial direction with respect to said axis, the radial direction being fixed with respect to the support, the cam member further being stably cooperating in contact with the radially inner surface, each groove being configured to accommodate the cam element when the lever reaches a corresponding one of said distinct angular positions.

In one form, the invention can be a steering wheel assembly for a motor vehicle, the steering wheel assembly comprising a steering column and a steering wheel rotatable with respect to the steering column about a steering wheel axis and comprising the selector knob of the preceding paragraph. In one form, the invention can be a motor vehicle comprising the steering wheel assembly and a control unit configured to receive the control signal and to select a control setting of the motor vehicle associated with the actual angular position.

BRIEF DESCRIPTION OF THE DRAWINGS

Hereinafter, an embodiment of the invention will be described, in order to allow the latter to be better understood, by way of non-limiting example and with reference to the accompanying drawings, wherein:

FIG. 5 is a perspective view of the selector knob of FIG. 3 in an assembled state;

DETAILED DESCRIPTION OF THE INVENTION

Figure 1:
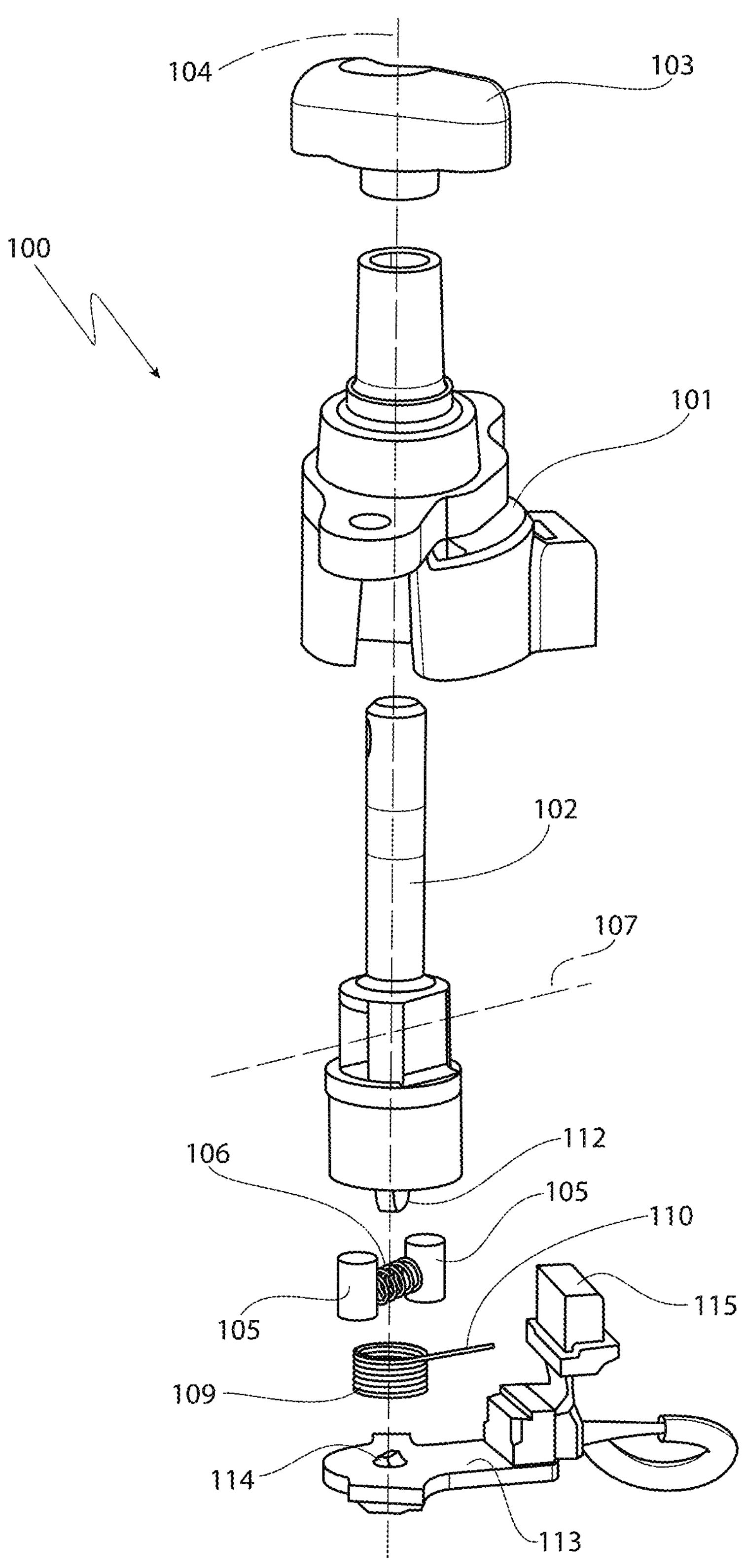
FIG. 1 is an exploded view of a selector knob according to the prior art.
Figure 2:
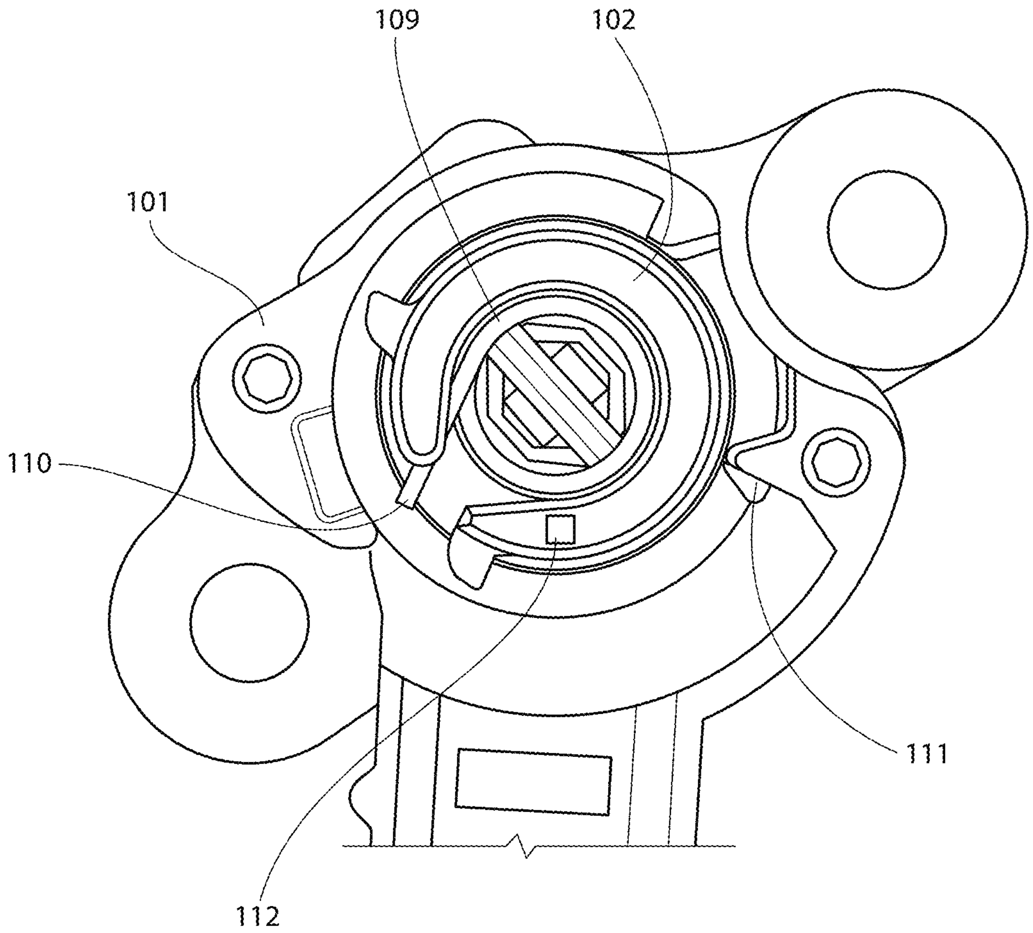
FIG. 2 is a view from the bottom of the selector knob of FIG. 1, with parts removed for greater clarity.

In FIG. 1, reference number 1 is used to indicate, as a whole, a motor vehicle.

The motor vehicle 1 is provided with a steering wheel 3, in particular within a passenger compartment of the motor vehicle 1.

The motor vehicle 1 has a seat for a driver inside the passenger compartment.

The driver's seat is located in front of the steering wheel 3, according to the travel direction or roll axis or longitudinal axis of the motor vehicle 1.

The steering wheel 3 is part of a steering wheel assembly further comprising a steering column of the known type and not shown, with respect to which the steering wheel 3 rotates.

Indeed, the steering wheel 3 has a rotation axis A1, which has at least one component along the longitudinal axis or is parallel thereto. Therefore, the steering wheel 3 can rotate about the rotation axis A1, in particular with respect to the steering column.

The rotation axis A1 is perpendicular to a relative rotation plane of the steering wheel 3.

The steering wheel 3 comprises a selector knob 4 to select a control setting of the motor vehicle 1.

Specifically, the selector knob 4 is used to set or select a dynamic configuration or a setup of the motor vehicle 1 among various pre-established options available (for example, a configuration designed for wet roads, a sports configuration and the like).

Furthermore, preferably, each of the pre-established options could also correspond to a specific configuration or adjustment of the suspensions of the motor vehicle 1.

Therefore, the control setting coincides with the dynamic configuration or setup of the motor vehicle 1 among the pre-established options available.

More precisely, the control setting relates to at least one or more of a suspension setup, a stability control and a traction control of the motor vehicle 1.

The knob 4 comprises a support 5 attached to the steering wheel 3 and a lever or graspable portion 6 carried by the support in a rotary manner so that it can rotate about a straight axis A, specifically parallel to the axis A1, among a plurality of specific distinct angular positions.

Figure 3:
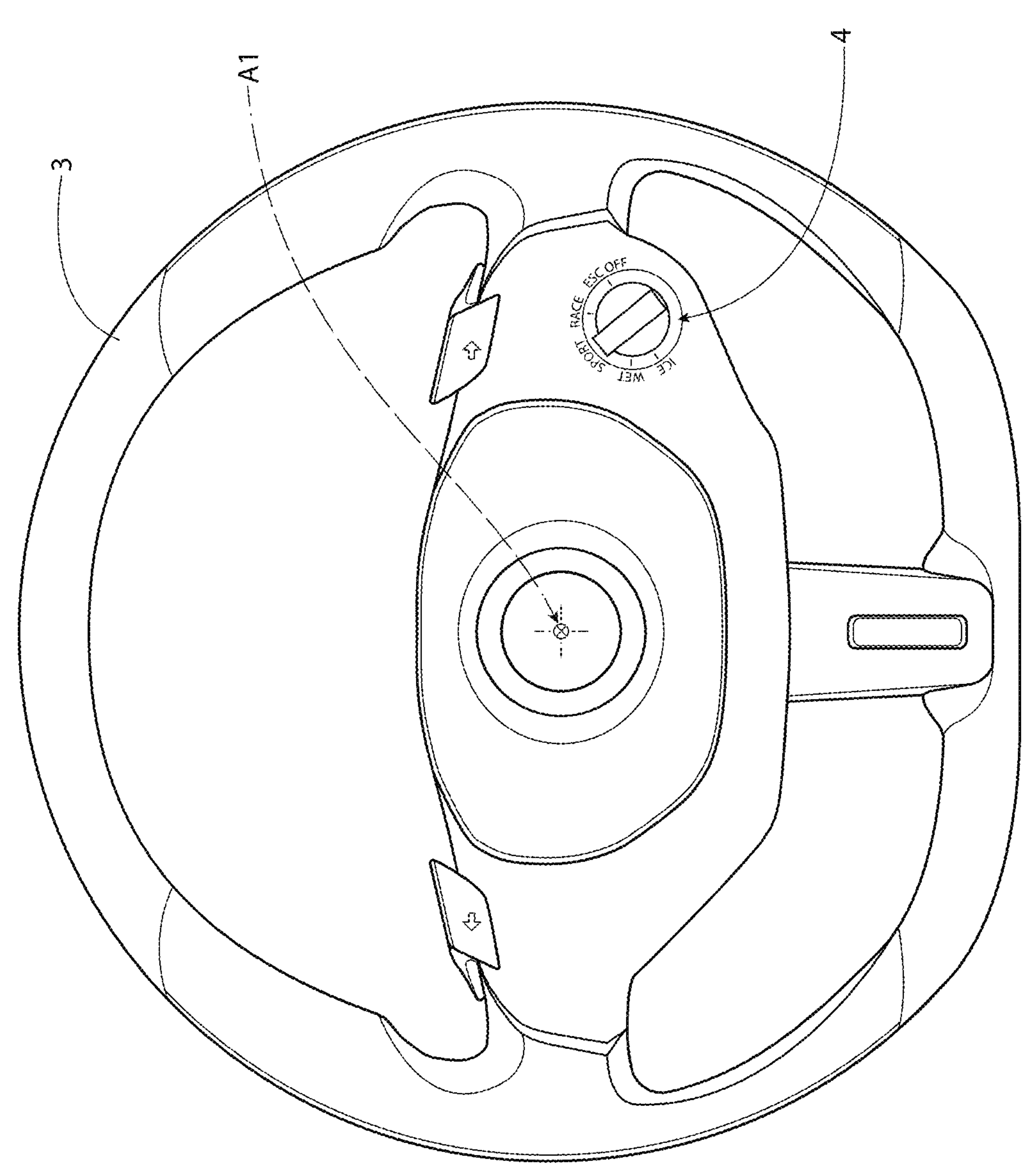
FIG. 3 is a front view of a steering wheel comprising a selector knob according to the invention.
Figure 4:
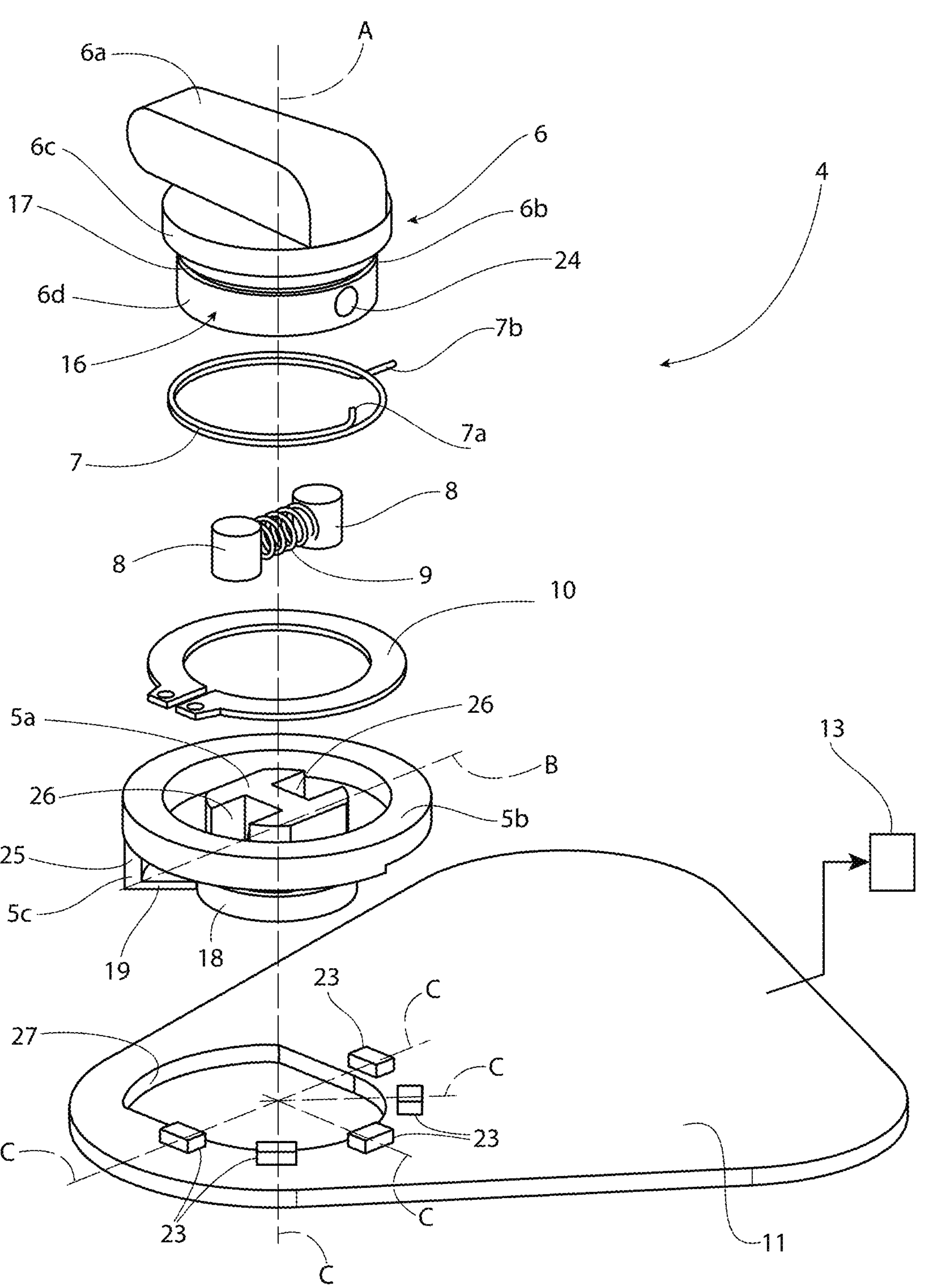
FIG. 4 is an exploded view of the selector knob of FIG. 3.

With reference to FIG. 3, the distinct angular positions are respectively marked by the reference symbols ICE (corresponding to a configuration designed for icy roads), WET (corresponding to a configuration designed for wet roads), SPORT (corresponding to a sports configuration), RACE (corresponding to a racing configuration), ESC OFF (corresponding to an extreme configuration, in which the controls of the motor vehicle 1 are deactivated). As explained more in detail below, the ESC OFF position preferably is an unstable position of the knob 4.

In particular, the knob 4 also comprises the following components, independently of one another: a torsional spring 7, two cam elements 8, an elastic element 9, which couples the cam elements 8 to one another, a stop ring 10 and a printed circuit board 11.

In addition, the knob 4 comprises a transduction assembly, potentially comprising, in turn, the printed circuit board 11, configured to detect information about an actual angular position of the lever 6 among the specific distinct angular positions.

The transduction assembly is also configured to generate or emit a control signal corresponding to the detected information.

The motor vehicle 1 comprises a control unit 13 coupled to the transduction assembly so as to receive the control signal. By means of the control signal, the control unit 13 is configured to impose or control the control setting of the motor vehicle 1 corresponding to the actual angular position of the lever 6.

Indeed, the control signal carries the information about the actual angular position of the lever 6, which is extracted by the control unit 13, so that the latter imposes the relevant control setting based on the extracted information.

The lever 6 comprises a pointer or handle element **6*a* extending in a radial manner with respect to the axis A and a portion 6*b*, in particular axially symmetrical or defining a solid of revolution about the axis A, from which the handle 6*a*** axially protrudes.

The portion **6*b* has an axial end 6*c*, from which the element 6*a* protrudes, and an axial end 6*d* opposite to the axial end 6*c*** along the axis A.

The end **6*d*** preferably is substantially cylindrical about the axis A.

The end **6*d* axially defines a cavity 14, so that the lever 6 or, more in particular, the end 6*d* has a radially inner surface 15, specifically radially defining the cavity 14**.

The lever 6 or, more precisely, the end **6*d* also has a radially outer surface 16**.

Basically, the lever 6 or, more precisely, the end **6*d* is shaped like a cup internally defining the cavity 14. The handle 6*a*** represents the cup handle.

In particular, the radially outer surface 16 has a groove 17 extending like a ring or in a helical manner about the axis A and defining a seat for the torsional spring 7.

The torsional spring 7 is at least partially accommodated in this seat.

The torsional spring 7 is wound around the axis A on the radially outer surface 16, in particular at least partially inside the dedicated seat.

The torsional spring 7 extends in a helical manner about the axis A.

The torsional spring 7 has an end **7*a* attached to the lever 6 and a free end 7*b*, which preferably protrudes with respect to the radially outer surface 16 towards the outside of the lever. However, this is not essential, since the free end 7*b* could have passed through a hole in the lever 6, thus getting into the cavity 14, namely protruding with respect to the radially inner surface 15 towards the inside of the lever 6**.

The free end **7*b* preferably extends on a plane orthogonal to the axis A. The free end 7*b*** can extend radially with respect to the axis A or also according to distinct directions belonging to the plane orthogonal to the axis A.

The support 5 comprises a radially innermost or central portion **5*a*, which axially extends along the axis A and is arranged inside the cavity 14, namely inside the lever 6, in particular centrally. Therefore, the portion 5*a* is an inner portion with respect to the lever 6**.

The portion **5*a* has a through-hole 21 (FIG. 9) along a radial direction or radial axis B with respect to the axis A. The through-hole 21 has two opposite ends according to the direction B defined by respective seats 26 for the cam elements 8. The cam elements 8 have respective portions that engage the seats 26, so that the cam elements 8 partially protrude from the seats 26 along the direction B towards the radially inner surface 15**.

The elastic element 9 extends along or through the hole 21 between the cam elements 8 according to the axis B. In particular, the elastic element 9 comprises a helical spring with opposite ends attached to the cam elements 8, respectively; the spring of the elastic element 9 extends in a helical manner around the direction B between the cam elements 8.

Basically, the cam elements 8 are coupled to the support 5 or, more precisely, to the portion **5*a* in a movable manner along the direction B, in particular in an oscillating manner along the direction B by means of the elastic element 9. Indeed, the cam elements 8 are partially housed in the relative seats 26 defined by walls of the support 5 or, more precisely, of the portion 5*a*, with which the cam elements 8 are in sliding contact along the direction B, so that the seats 26 avoid movements of the cam elements 8 aside from movements along the direction B, which, among other things, is fixed with respect to the support 5** independently of all other aspects.

Here, the sliding contact between the cam elements 8 and the walls defining the relative seats 26 defines the coupling between the cam elements 8 and the support 5 or the portion **5*a*. Alternatively, the coupling between the cam elements 8 and the walls defining the relative seats 26 could have a clearance, namely without implying an actual contact between the cam elements 8 and the walls of the seats 26, so that the latter still have the function of substantially limiting the admissible movements of the cam elements 8** to the movements along the direction B.

Therefore, the cam elements 8 can be brought closer to one another along the direction B against an elastic reaction of the elastic element 9 along the direction B.

In addition, the support 5 comprises a radially outermost or peripheral portion 5*b*, which extends like a ring around the axis A, in particular forming a collar around the lever 6, which is therefore embraced by the collar.

The lever 6 or, more precisely, the end 6*d* is arranged radially (with respect to the axis A) between the portions 5*a*, 5*b* of the support.

Basically, the lever 6 is axially inserted through the portion 5*b* with the cavity 14 facing the portion 5*a*, so that the latter portion is covered or housed by the lever 6 in the cavity 14.

The portions 5*a*, 5*b* are connected to one another by means of a connecting portion or rib 5*c* of the support 5. Preferably, the support 5 is manufactured as one single piece, whereby the portions 5*a*, 5*b*, 5*c* form one single body, without interruptions.

More in detail, the portion 5*c* has an element 18, which axially extends from the portion 5*a* coming out of the cavity 14, namely so as to be arranged on the outside of the lever 6.

Furthermore, the portion 5*c* has an element 19, which extends from the element 18 in a radial manner with respect to the axis A. The element 19 has an angular extension around the axis A according to an acute angle, so that the majority of the space around the axis A surrounding the element 19 is substantially free.

Furthermore, the portion 5*c* has an element 25, which axially extends from a radial outermost end of the element 19 until it ends on the portion 5*b*, thus creating the connection between the portions 5*a*, 5*b*.

Preferably, the element 25 has a portion that is axially (i.e. according to the axis A) located at the free end 7*b* of the torsional spring 7, namely at the plane on which the free end 7*b* lies.

Figure 7:
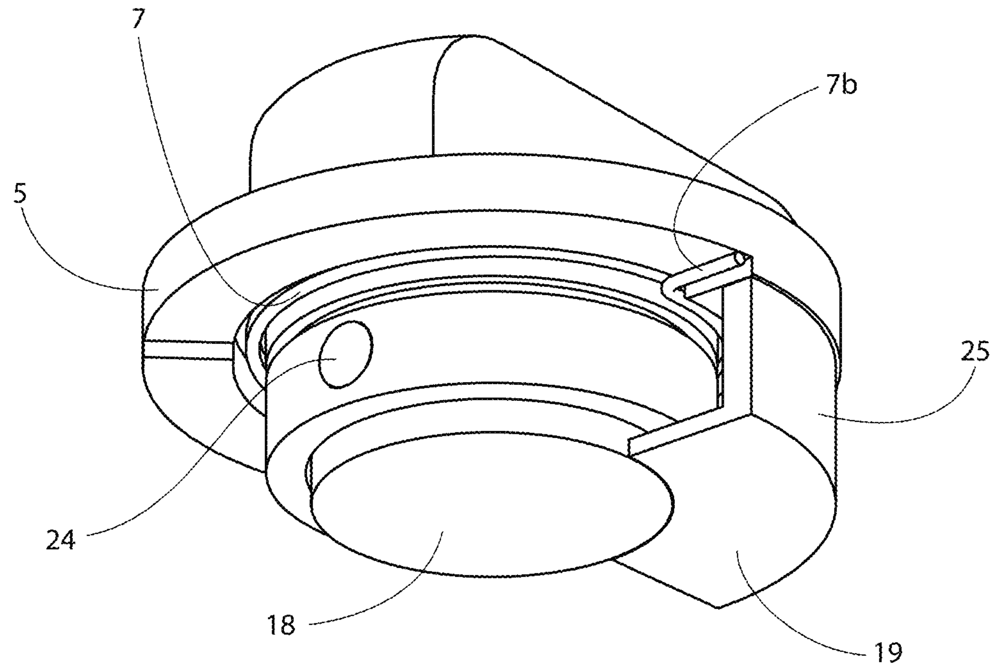
FIG. 7 is similar to FIG. 6 and shows the selector knob in a different configuration from the one of FIG. 6.
Figure 8:
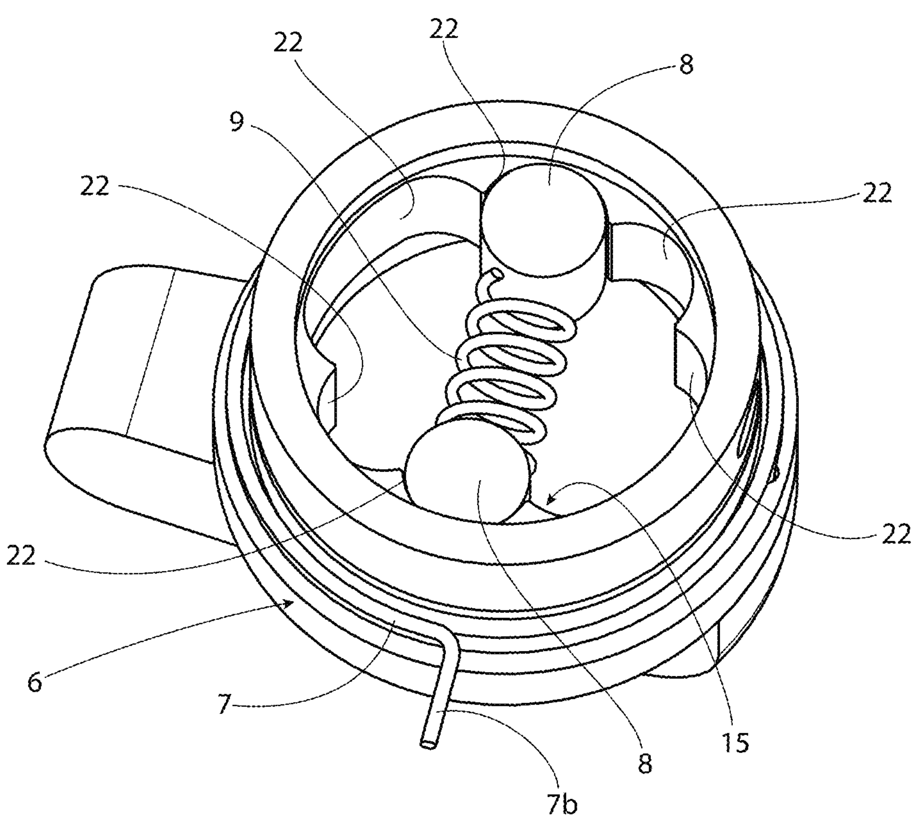
FIG. 8 is a perspective view of a lower area of a lever of the selector knob of FIG. 5.

In this way, the support 5 or, more precisely, the portion 5*c* or, even more precisely, the element 25 define a striker portion arranged so as to cooperate with the free end 7*b* in one of the angular positions of the lever 6 (FIG. 7). As explained more in detail below, this angular position of the lever 6 defines, in particular, the unstable position ESC OFF of the lever 6.

Figure 6:
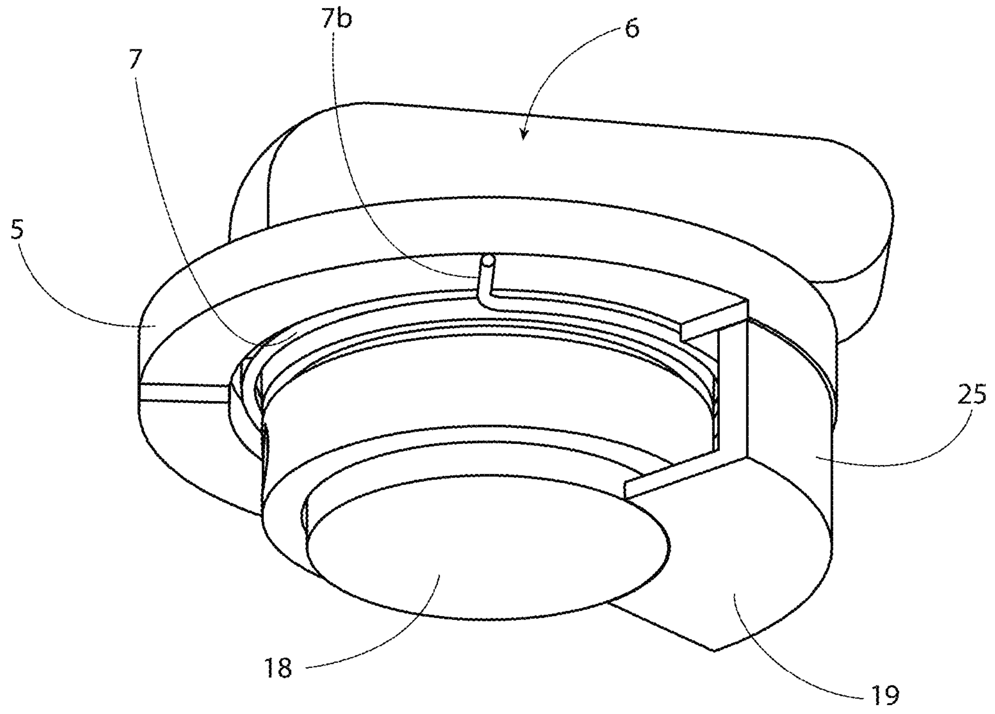
FIG. 6 is a perspective view of the selector knob of FIG. 5 according to a different perspective point of view and with parts removed for greater clarity.

By rotating the lever 6 around the axis A, for example in a clockwise direction, from an angular position other than the unstable position ESC OFF (for example, the one of FIG. 6), the free end 7*b* meets the striker portion (FIG. 7) starting to cooperate with it according to a circumferential direction around the axis A. The cooperation between the free end 7*b* and the striker portion does not forbid a further rotation or a rotation advancement, in this example in a clockwise direction, of the lever 6, but the further rotation causes the torsional spring 7 to be twisted. By so doing, the torsional spring 7 reacts with an elastic reaction torque contrary to the further rotation of the lever 6.

Therefore, the elastic reaction torque is oriented so that the lever 6 leaves the unstable position ESC OFF.

The unstable position ESC OFF (FIG. 3) is an extreme position among the angular positions of the lever 6, i.e. it is located at one of the two ends of the path that can be covered by the lever 6 or by the handle 6*a* around the axis A.

The stop ring 10, which is more specifically defined by a Seeger ring, is arranged so as to radially cooperate with the radially outer surface 16 and axially cooperate with the portion 5*b* of the support 5 so as to prevent lever 6 from accidentally slipping out of the support 5 along the axis A.

The printed circuit board 11 is, more generally, a support or attachment body that extends crosswise to the axis A.

In particular, the attachment body or printed circuit board 11 is plate-shaped and extends on a plane that is transversal or, more specifically, orthogonal to the axis A.

The attachment body or printed circuit board 11 has an axial bore 27 around the axis A, in particular a through bore 27.

The lever 6 and also, specifically, the support 5 are axially inserted in the bore 27, namely they engage the bore 27 in an axial manner.

Preferably, one of the cam elements 8 stably cooperates in contact with the radially inner surface 15 of the lever 6.

Figure 9:
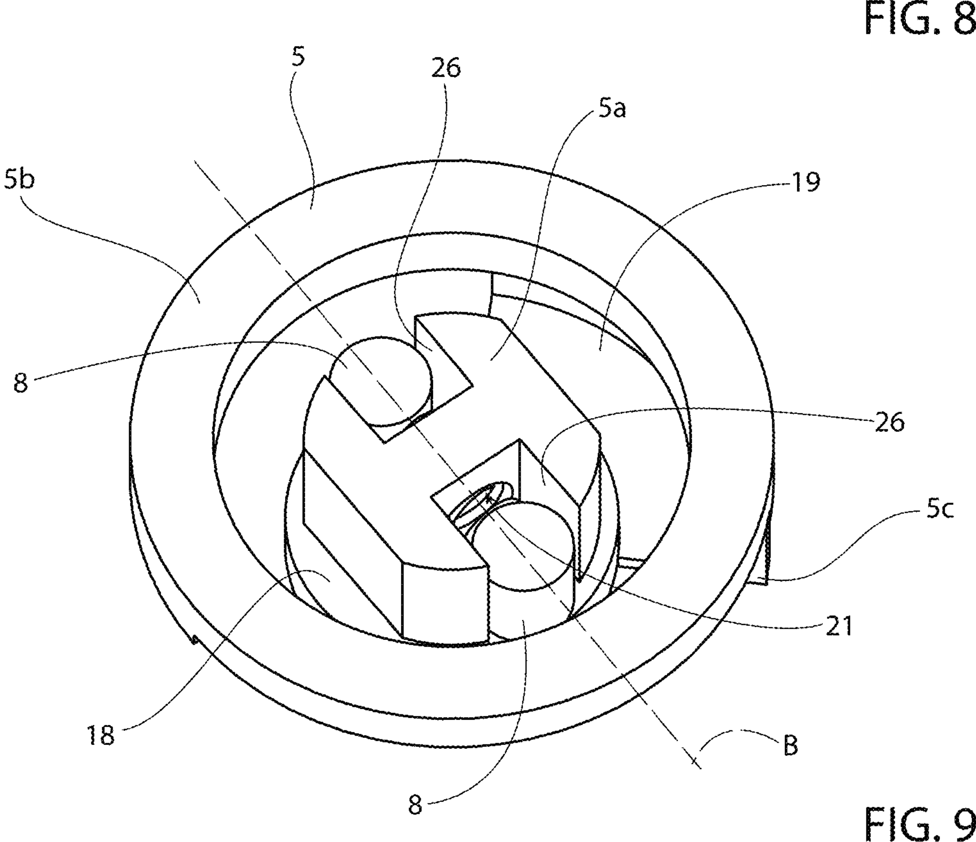
FIG. 9 is a perspective view of a support for the lever of FIG. 8.
Figure 10:
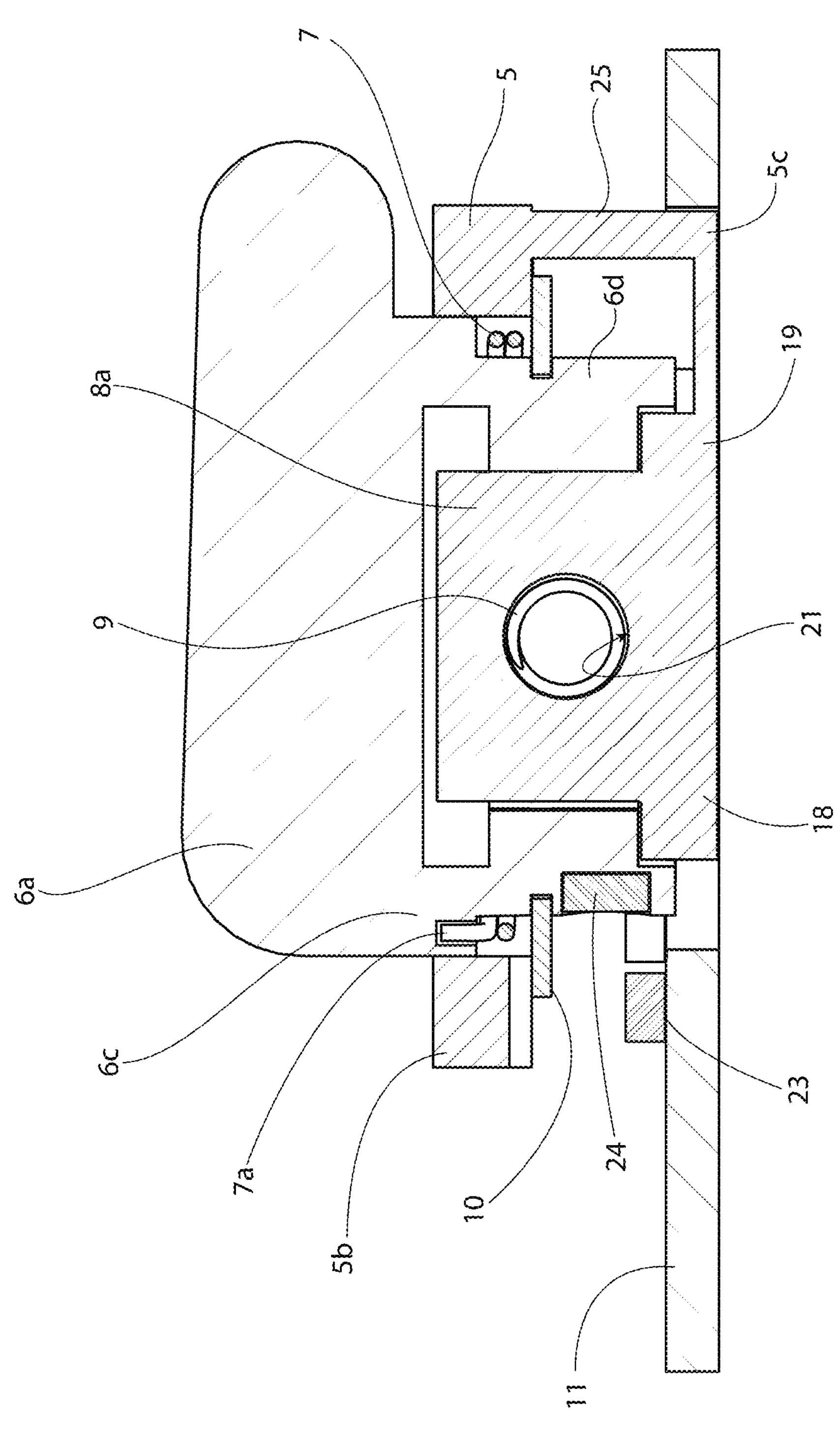
FIG. 10 is a cross section of the assembled knob of FIG. 5 according to a radial plane with respect to a rotation axis of the lever.

More in detail, as shown in FIG. 9, the cam element 8 partially protrudes from the relative seat 26 on the support 5 along the direction B to cooperate with the radially inner surface 15. As already mentioned above, the seat 26 of the cam element 8 extends along the direction B, in particular towards the axis A.

Specifically, both cam elements 8 stably cooperate in contact with the radially inner surface 15 of the lever 6. This is not strictly necessary, although advantageous, first of all because even a single cam element 8 could be sufficient to stably cooperate with the radially inner surface 15. For example, the single cam element 8 could be coupled to the support 5 or, more precisely, to the portion 5*a* by means of an elastic element not shown herein with ends fixed to the support 5 and to the single cam element 8, respectively, so that the cam element 8 can still be arranged in an oscillating or movable manner along the direction B, this time with respect to the sole support 5 instead of with respect to the other cam element 8.

The radially inner surface 15 extends around the axis A and defines a plurality of grooves 22, wherein each of the grooves 22 accommodates one of the cam elements 8 when the lever 6 reaches or is in a corresponding position among the specific distinct angular positions of the lever 6.

Specifically, for each specific angular position of the lever, the other one of the cam elements 8 also is accommodated by another one of the grooves 22 or by a further groove of the radially inner surface 15.

The grooves 22 are concave with a concavity facing the axis A. Furthermore, on a plane orthogonal to the axis A, the grooves 22 have respective profiles, each shaped like an arc of a circle or an ellipse. The profiles might not all be the same. For example, the profile of the groove 22 that accommodates the cam element 8 in the unstable position ESC OFF of the lever 6 could be longer than the others and elliptical.

Specifically, still on the plane orthogonal to the axis A, the profiles of two grooves 22 adjacent to one another form a cusp or an angular point, i.e. a discontinuity. Alternatively, the cusp could be replaced by a fillet to soften the discontinuity between two adjacent grooves 22.

In particular, since the cam elements 8 are coupled to one another by means of the elastic element 9 arranged through the hole 20, the elastic element 9 is configured to space the cam elements 8 apart from one another and to bring the cam elements 8 in contact with the radially inner surface 15 at points that are diametrically opposite relative to the axis A.

For example, the elastic element 9 can be pre-loaded so as to ensure the stable contact of the cam elements 8 with the radially inner surface 15, while allowing the cam elements 8 to move closer to one another along the direction B against its elastic reaction.

Preferably, the transduction assembly of the knob 4 comprises a number of sensors 23 equal to the number of the specific distinct angular positions of the lever 9.

The sensors 23 are angularly distributed about the axis A and face the lever 6 according to respective radial directions C with respect to the axis A.

In particular, the sensors 23 are arranged on the outside of the lever 6, so that they face the radially outer surface 16.

Each of the sensors 23 is configured to detect the presence of a device 24 attached to the lever 6 when the lever 6 reaches a corresponding position among the specific distinct angular positions, thereby detecting the actual angular position of the lever 6.

Each of the sensors 23 faces the lever 6 according to a corresponding radial direction C, meaning that it is configured to detect the presence of the device 24 along the radial direction C, namely when the radial direction C is directed on the device 24. In other words, each sensor 23 has the capacity to detect the presence of the device 24 in the relative radial direction C.

For example, the sensors 23 can be magnetic sensors, i.e. sensors that are each configured to detect a magnetic field emitted by the device 24 along the relative radial direction C. In this case, the device comprises, in particular, a permanent magnet. By detecting the magnetic field emitted by the permanent magnet when the lever reaches the corresponding position, each sensor 23 detects the presence of the device 24 and, hence, the actual angular position of the lever. More specifically, the sensors 23 are Hall effect sensors.

Alternative examples of sensors 23 and of the device 24 can be multiple; for example, the sensors 23 could be optical sensors when the device 24 comprises an emitter of light rays that are radial with respect to the axis A or, more generally, electromagnetic radiation detectors when the device 24 comprises an emitter of electromagnetic radiation that is radial with respect to the axis A.

Specifically, in each of the specific distinct angular positions of the lever 6, the device 24 is aligned with a corresponding one of the sensors 23 along one of the radial directions C.

Preferably, the device 24 is housed on a seat obtained on the radially outer surface 16, such that the device 24 is radially exposed to the outside of the lever 6.

In the embodiment shown herein, the seat for the torsional spring 10 is axially arranged between the handle 6*a* or the portion 6*c* and the seat for the device 24.

Furthermore, the sensors 23 are attached to the printed circuit board 11, in particular directly.

Preferably, the parts of the cam elements 8 and of the lever 6 stably cooperating in contact with one another are metallic.

In the operation of the knob 4, the driver can move the lever 6 from one of its specific distinct angular positions to another one of these. Here, the cam elements 8 leave the relative grooves 22 that accommodate them. In order to leave the grooves 22, the cam elements 8 move closer to one another along the direction B thanks to the stable cooperation between the cam elements 8 and the radially inner surface 15 against the elastic reaction of the elastic element 9, which compresses along the direction B.

At this stage, the driver perceives a resistance corresponding to the compression of the elastic element 9.

When the cam elements get into the grooves 22 corresponding to the new angular position of the lever 6, the elastic reaction of the elastic element 9 favours the settlement of the cam elements 8 in the grooves 22. Here, the driver perceives a sensation of release and ease of reaching the new angular position of the lever 6.

In the meantime, the metal parts in contact generate a sound associated with the mutual movement.

Owing to the above, the advantages of the knob 4 according to the invention are evident.

In particular, the fact that the grooves 22 are obtained on the lever 16 and that the cam elements 8 are carried by the portion 5*a* in the cavity 14 allows the knob 4 to be significantly more compact in axial terms.

Similarly, the radial arrangement of the sensors 23 around the axis A also has the same effect of improving the axial compactness of the knob 4.

Furthermore, the fact that the cam elements 8 have metal parts stably cooperating in contact with a metal surface guarantees improved sensations for the driver compared to a solution with metal parts in contact with a plastic element.

In addition, compared to the prior art, the number of necessary components decreases together with the complexity of the entire knob 4, although all the functions of known solutions are maintained by the knob 4.

Finally, the knob 4 according to the invention can clearly be subject to changes and variants, which, though, do not go beyond the scope of protection defined by the appended claims.

In particular, the number of the various components described and shown herein is a mere example, but the number of them could change.

Similarly, the shape of the components described and shown herein could be different.

Furthermore, the description includes two independent and combinable aspects, which both have the effect of enabling a reduction in the axial dimension of the knob 4.

In particular, according to the first aspect, the knob 4 comprises at least one cam element 8 coupled to the support 5 in a movable manner along the radial direction B with respect to the axis A and fixed with respect to the support 5, the cam element 8 further being stably cooperating in contact with the radially inner surface 15 of the lever 6 extending about the axis A and defining the plurality of grooves 22, each of which accommodates the cam element 8 when the lever 6 reaches a corresponding one of said distinct angular positions.

According to the second aspect, alternatively or in addition to the first aspect, the transduction assembly or means comprise a number of sensors 23 equal to the number of distinct angular positions, the sensors 23 being angularly distributed about the axis A and facing the lever 6 according to respective radial directions C with respect to the axis A, wherein each of the sensors 23 is configured to detect the presence of the device 24 fixed to the lever 6 when the lever 6 reaches a corresponding one of said distinct angular positions, thereby detecting the actual angular position of the lever 6.

The invention claimed is:

1. A selector knob for a motor vehicle, the selector knob comprising:

a support adapted to be attached to a component of the motor vehicle;

a lever carried by the support in a rotatable manner about a straight axis among a plurality of distinct angular positions;

transduction means configured to detect information about an actual angular position of the lever among said distinct angular positions and to generate a control signal corresponding to the detected information to select a control setting of the motor vehicle associated with the actual angular position; and a cam element coupled to the support in a movable manner along a direction radial with respect to said axis and fixed with respect to the support, the cam element further being in contact with a radially inner surface of the lever extending about said axis and defining a plurality of grooves, each of which accommodates the cam element when the lever reaches a corresponding one of said distinct angular positions, wherein the transduction means comprise a number of sensors equal to the number of said distinct angular positions, the sensors being arranged angularly distributed about said axis and facing the lever according to respective radial directions with respect to said axis, wherein each of the sensors is configured to detect the presence of a device fixed to the lever when the lever reaches a corresponding one of said distinct angular positions, thereby detecting the actual angular position of the lever.

2. The selector knob according to claim 1, wherein the support comprises an inner portion relative to the lever, the inner portion extending axially along said axis and having a seat extending along said radial direction and engaged by a portion of the cam element so that the cam element partially protrudes from the seat along said radial direction to cooperate with the radially inner surface.

3. The selector knob according to claim 2, wherein the cam element comprises a first cam element, wherein the seat defines one end of a through-hole of the inner portion along said radial direction, the through-hole comprising a further seat defining the other opposite end of the through-hole and engaged by a portion of a second cam element cooperating with the radially inner surface, the first and second cam elements being coupled together by an elastic means arranged through the through-hole and configured to distance the first and second cam elements from each other, thereby bringing the first and second cam elements into contact with the radially inner surface at diametrically opposite points with respect to said axis and permitting a reciprocal approach of the first and second cam elements along said radial direction against an elastic reaction thereof.

4. The selector knob according to claim 1, further comprising a torsional spring extending about said axis and having an end attached to the lever and a free end, the support comprising a striker portion arranged to cooperate with the free end at an unstable position among said distinct angular positions, such that the torsion spring exerts an elastic reaction torque on the lever directed so that the lever leaves the unstable position.

5. The selector knob according to claim 1, wherein the device fixed to the lever comprises a permanent magnet, and wherein the sensors comprise respective magnetic field sensors each configured to detect a magnetic field emitted by the permanent magnet when the lever reaches the corresponding one of said distinct angular positions, thereby detecting the presence of the device and thus the actual angular position of the lever.

6. The selector knob according to claim 1, wherein the device fixed to the lever at each of said distinct angular positions of the lever is aligned with a corresponding one of the sensors along one of said radial directions.

7. The selector knob according to claim 1, wherein the device fixed to the lever is housed in a device seat formed on a radially outer surface of the lever, such that the device is radially exposed to the outside of the lever.

8. The selector knob according to claim 1, wherein the sensors are attached to an attachment body, defined by a printed circuit board, extending transversely to said axis and having an axial bore around said axis, the axial bore being axially engaged by the lever.

9. The selector knob according to claim 1, wherein the radially inner surface of the lever is metallic, and wherein the portion of the cam element in contact with the radially inner surface of the lever is metallic.

10. A steering wheel assembly for a motor vehicle, the steering wheel assembly comprising a steering column and a steering wheel rotatable with respect to the steering column about a steering wheel axis and comprising the selector knob of claim 1.

11. A motor vehicle comprising the steering wheel assembly of claim 10, further comprising a control unit configured to receive the control signal and control the control setting according to the received control signal.

12. The motor vehicle according to claim 11, wherein the control setting relates to at least one of a motor vehicle suspension setup, a motor vehicle stability control, and a motor vehicle traction control.

13. A selector knob for a motor vehicle, the selector knob comprising:

a support adapted to be attached to a component of the motor vehicle;

a lever carried by the support in a rotatable manner about an axis among a plurality of distinct angular positions;

a transduction assembly configured to detect information about an actual angular position of the lever and to generate a control signal corresponding to the detected information; and a cam member coupled to the support in a movable manner along a radial direction with respect to said axis, the radial direction being fixed with respect to the support, the cam member further being in contact with a radially inner surface of the lever extending about said axis and defining a plurality of grooves, each of which accommodates the cam member when the lever reaches a corresponding one of said distinct angular positions, wherein the transduction assembly comprises a plurality of sensors, the sensors being arranged angularly distributed about said axis and facing the lever according to respective radial directions with respect to said axis, wherein each of the sensors is configured to detect the presence of a radially-facing device fixed to the lever when the lever reaches a corresponding one of said distinct angular positions, thereby detecting the actual angular position of the lever.

14. A steering wheel assembly for a motor vehicle, the steering wheel assembly comprising a steering column and a steering wheel rotatable with respect to the steering column about a steering wheel axis and comprising the selector knob of claim 13.

15. A motor vehicle comprising the steering wheel assembly of claim 14, further comprising a control unit configured to receive the control signal and to select a control setting of the motor vehicle associated with the actual angular position.

16. A selector knob for a motor vehicle, the selector knob comprising:

a support adapted to be attached to a component of the motor vehicle;

a lever carried by the support in a rotatable manner about an axis among a plurality of distinct angular positions, the lever comprising a radially inner surface extending about said axis and grooves defined in the radially inner surface;

a sensor system configured to detect information about an actual angular position of the lever and to generate a control signal corresponding to the detected information; and a cam member coupled to the support in a movable manner along a radial direction with respect to said axis, the radial direction being fixed with respect to the support, the cam member further being in contact with the radially inner surface, each groove being configured to accommodate the cam member when the lever reaches a corresponding one of said distinct angular positions, wherein the sensor system comprises a plurality of sensors, the sensors being arranged angularly distributed about said axis and facing the lever according to respective radial directions with respect to said axis, wherein each of the sensors is configured to detect the presence of an outwardly-facing element fixed to the lever when the lever reaches a corresponding one of said distinct angular positions, thereby detecting the actual angular position of the lever.

17. A steering wheel assembly for a motor vehicle, the steering wheel assembly comprising a steering column and a steering wheel rotatable with respect to the steering column about a steering wheel axis and comprising the selector knob of claim 16.

18. A motor vehicle comprising the steering wheel assembly of claim 17, further comprising a control unit configured to receive the control signal and to select a control setting of the motor vehicle associated with the actual angular position.

* * * * *